United States Patent Office 3,210,116
Patented Oct. 5, 1965

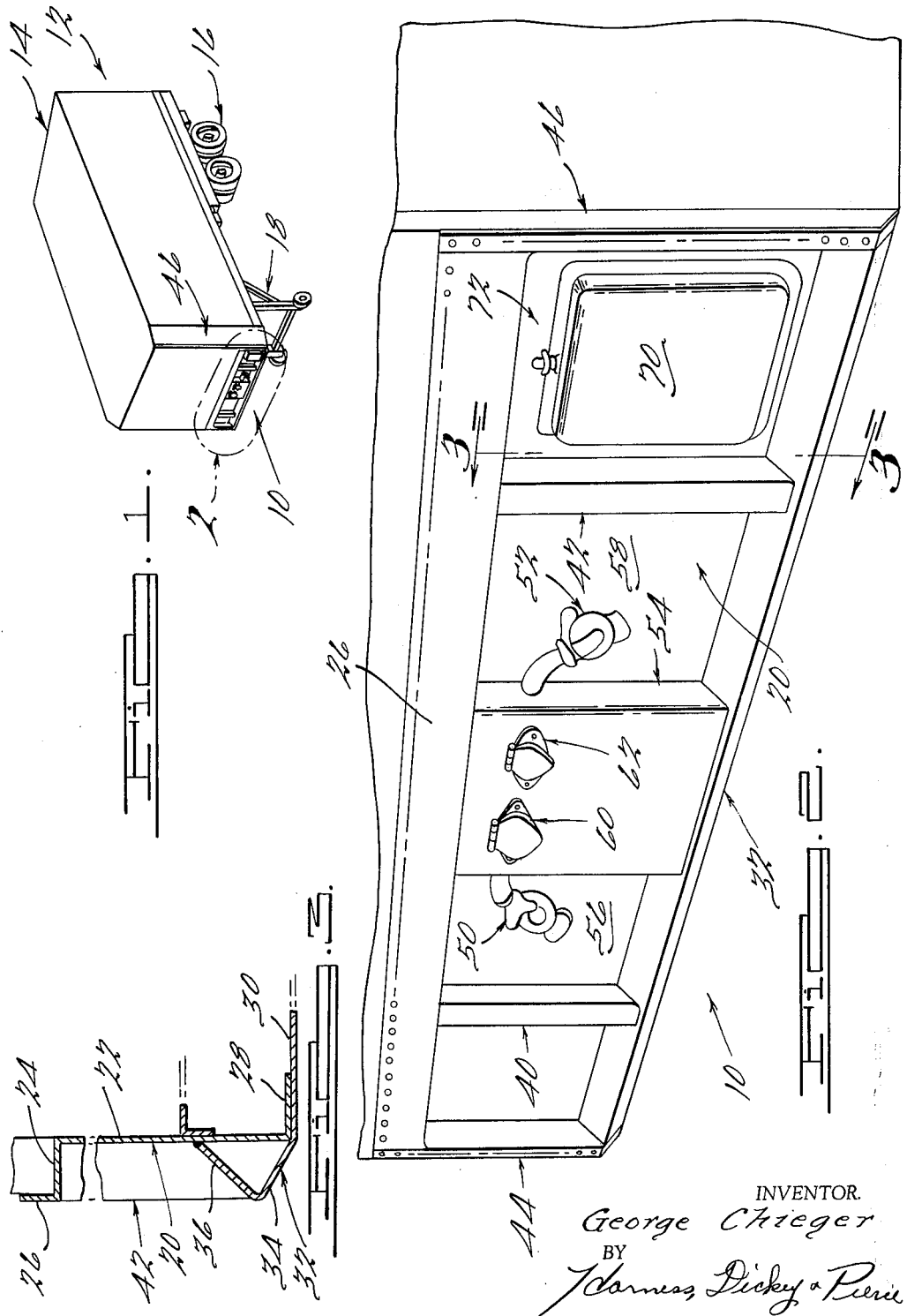

3,210,116
TRAILER CONSTRUCTION
George Chieger, Grosse Pointe Woods, Mich., assignor to Fruehauf Corporation, a corporation of Michigan
Filed May 21, 1963, Ser. No. 281,928
1 Claim. (Cl. 296—37)

This invention relates generally to trailer constructions, and more particularly to an improved recessed front wall construction for heavy duty semi-trailers.

Semi-trailers are generally provided with a rear wheel suspension having air actuated brakes. Also, such trailers are provided with an extensive array of tail and running lights. Generally, however, the power source for both the brakes and the lights of the trailer is located in the tractor thereby necessitating some form of separable coupling in the brake and electrical lines to facilitate separation of the tractor from the trailer.

It has heretofore been the practice to simply extend the brake and electrical lines forwardly of the front wall of the trailer to provide for coupling thereof to supply lines from the tractor. However, it has been found that when semi-trailers are parked for loading, unloading or storage, that such supply lines are often damaged due to the fact that they extend outwardly of the horizontal cross section of the van defined by the structural members of the front wall.

Accordingly, the present invention solves this problem by utilizing a novel recessed front wall construction for the trailer within which the couplings for the brake and electrical lines are located.

Provision of a recess in the front wall of a trailer is complicated by the fact that structural integrity of the front wall must be insured. This requirement is satisfied by the front wall construction of the instant invention which utilizes a relatively heavy recessed front wall plate that extends into load transfer relationship with a lower transverse rail of the trailer as well as providing a suitable seat for the vertically extending posts which extend above the recess and reinforce the upper front wall of the trailer.

Accordingly, one object of the instant invention is an improved front wall construction for semi-trailers and the like.

Another object of the instant invention is a recessed front wall construction for a semi-trailer wherein the brake and electrical supply lines do not extend outwardly of the horizontal cross section of the trailer van.

Other objects and advantages of the instant invention will be apparent in the following specification, claims and drawings, wherein:

FIGURE 1 is a perspective view of a semi-trailer having the recessed front wall construction of the instant invention;

FIG. 2 is an enlarged fragmentary view taken within the circle 2 of FIGURE 1; and FIG. 3 is a cross sectional view taken substantially along the line 3—3 of FIGURE 2.

A recessed front wall construction 10, in accordance with an exemplary constructed embodiment of the instant invention is shown applied to a semi-trailer 12. The trailer 12 comprises a van-type enclosure 14, a wheel suspension 16, and a landing gear 18.

As best seen in FIGURE 2 of the drawing, the recessed front wall construction 10 comprises a relatively heavy recessed panel member 20 having a vertical portion 22, and a generally horizontal upper post seat 24, with a vertically extending flange 26 at the outer edge thereof. The recessed panel member 20 has a generally horizontally inwardly extending lower flange 28 adapted to be seated on a horizontal flange portion 30 of a lower front rail 32. The front rail 32 has an angularly upwardly and outwardly extending portion 34 and an angularly rearwardly extending upper edge portion 36 that is welded to the vertical portion 22 of the recessed panel member 20.

As best seen in FIGURE 2 of the drawing, a pair of vertically extending posts 40 and 42 extend between the lower rail 32 and the horizontal post seat portion 24 of the panel member 20. Similarly, a pair of posts 44 and 46, which constitute corner posts that define the outboard cross section of the van 14, extend vertically along the edges of the panel member 20.

In accordance with the instant invention, a pair of brake line couplers 50 and 52 extend laterally outwardly of a relatively wide center post 54 into a pair of receses 56 and 58 defined by the center post 54, intermediate posts 40 and 42, lower rail 32, and horizontal upper flange 24 on the panel member 20. Also, a pair of electrical connectors 60 and 62 are mounted on the center post 54 for connection to suitable conduits on the tractor (not shown). It is to be noted that the center post 54 is set back from the frontal edge of the lower rail 32 so that the electrical connectors 60 and 62 are entirely within the horizontal cross section of the trailer 12 defined by the lower rail 32.

As best seen in FIGURE 2 of the drawing, a manifest box 70 is mounted in a recess 72 defined by the vertical post 42, corner post 46, lower rail 32 and flange portion 24 on the recessed panel member 20. Thus, the manifest box 70, like the brake line couplers 50 and 52 and electrical connectors 60 and 62, is protected from the damage due to collision of the trailer 12 with, for example, a loading dock since it is within the horizontal cross section of the van 14 defined by the lower rail 32.

From the foregoing description it should be apparent that the recessed front wall construction for a heavy-duty highway trailer of the instant invention solves the problem of protecting brake and electrical line couplers from damage while insuring the structural integrity of the front wall of the trailer. The front wall utilizes a load bearing panel member that is recessed from the frontal edge of a lower transverse rail on the trailer. The brake and electrical line couplers are disposed forwardly of the recessed panel but within the horizontal cross section of the trailer defined by the lower rail.

It is to be understood that the specific trailer construction herein disclosed and described is presented for the purpose of explanation and illustration and is not intended to indicate limits of the invention, the scope of which is defined by the following claim.

What is claimed is:

An improved construction for the lower portion of the front wall of a heavy duty semi-trailer comprising
a transversely extending relatively heavy lower front rail having a frontal edge portion that defines the frontal periphery of the trailer, said front rail having a relatively heavy downwardly facing impact accepting portion,
a pluarlity of vertically extending posts secured to said lower front rail in stress transfer relationship,
a relatively heavy generally vertically extending panel member spaced rearwardly from the frontal edge of said front rail and rearwardly from said posts and secured to said front rail and to said posts in stress transfer relationship whereby outwardly directed loads on said panel member are transferred to said posts and to said lower front rail,
a brake line coupler disposed exteriorily of said panel member in the space defined by said lower front rail, said posts, and said vertical panel member for connection to a supply line, the spacing of said vertically extending panel member rearwardly from the frontal edge of said lower front rail being sufficient to substantially entirely accommodate said brake line coupler whereby said brake line coupler is protected against damage from the exterior of said trailer by said lower front rail and by said posts and is protected against damage from the interior of said trailer by said panel member, and an upper front wall portion having a frontal edge generally vertically aligned with the frontal edge of said lower front rail so as to define the upper limit of said space, said upper front wall being secured to said panel member and to said posts in stress transfer relationship whereby outwardly directed loads on said upper front wall portion are transferred to said vertical panel member thence to said vertical posts and to said lower front rail.

References Cited by the Examiner

UNITED STATES PATENTS

| D. 132,375 | 5/42 | Elkus. | |
|---|---|---|---|
| 1,704,662 | 3/29 | Flannery | 280—5 |
| 2,106,206 | 1/38 | Crossen | 280—5 |
| 2,698,758 | 1/55 | Ronning | 280—420 X |
| 3,125,354 | 3/64 | Connerat | 280—422 |

BENJAMIN HERSH, *Primary Examiner.*

A. HARRY LEVY, *Examiner.*